United States Patent [19]

Gönner

[11] Patent Number: 5,417,262
[45] Date of Patent: May 23, 1995

[54] DEVICE FOR CUTTING THIN BOARDS

[75] Inventor: Siegmar Gönner, Oberkirch, Germany

[73] Assignee: Firma Gebruder Linck Mashinenfabrik "Gatterlinck" GmbH & Co.KG, Oberkirch, Germany

[21] Appl. No.: 127,197

[22] Filed: Sep. 27, 1993

[30] Foreign Application Priority Data

Dec. 28, 1992 [DE] Germany .......... 9218129 U
May 17, 1993 [DE] Germany .......... 43 16 463.3

[51] Int. Cl.6 ............................... B27C 1/00
[52] U.S. Cl. .................. 144/175; 144/162 R; 144/1 A; 409/345; 483/28
[58] Field of Search .......... 144/1 A, 2 R, 130, 162 R, 144/175, 184; 483/28; 409/345, 346

[56] References Cited

U.S. PATENT DOCUMENTS

| 2,592,782 | 4/1952 | Zweifel et al. | 144/162 |
| 2,624,099 | 1/1953 | Berthiez | 409/345 |
| 3,783,917 | 1/1974 | Mochizuki | 144/175 |
| 4,103,414 | 8/1978 | Herb et al. | 483/28 |
| 4,624,044 | 11/1986 | Bredow et al. | 483/28 |
| 5,134,768 | 8/1992 | Tokura | 483/28 |

FOREIGN PATENT DOCUMENTS

| 2060942 | 7/1992 | Canada . | |
| 635369 | 12/1927 | France | 144/1 A |
| 902786 | 2/1954 | Germany . | |
| 2222694 | 11/1973 | Germany . | |
| 2438176 | 2/1976 | Germany | 409/346 |
| 3240667 | 5/1984 | Germany . | |
| 157422 | 12/1980 | Japan | 483/28 |

OTHER PUBLICATIONS

Brochure of The Römheld Company entitled "Werkstück-Bearbeitung Aufpaletten" (4 pages) (publication date not known).
Brochure of the Römheld Company entitled "Palettenwechseleinrichtungen Mit Federspannsystem" (3 pages) (publication date not known).
European Search Report dated Apr. 18, 1994 in European Patent Application No. 93 110 153.9.

Primary Examiner—W. Donald Bray
Attorney, Agent, or Firm—Marshall, O'Toole, Gerstein, Murray & Borun

[57] ABSTRACT

A device for cutting thin boards from cants includes a blade set in the device which is fastened to a blade holder which is mounted on a blade support. The blade support can be installed as an interchangeable component in a cutting table and clamped in the table in an exact position. A transfer apparatus, constructed as a rotating table, is alignable with the cutting device. By means of the transfer apparatus, the blade support can be removed from cutting device. The transfer apparatus can be movable or in a fixed position. Receiving surfaces for blade supports can be integrated into the transfer apparatus.

11 Claims, 3 Drawing Sheets

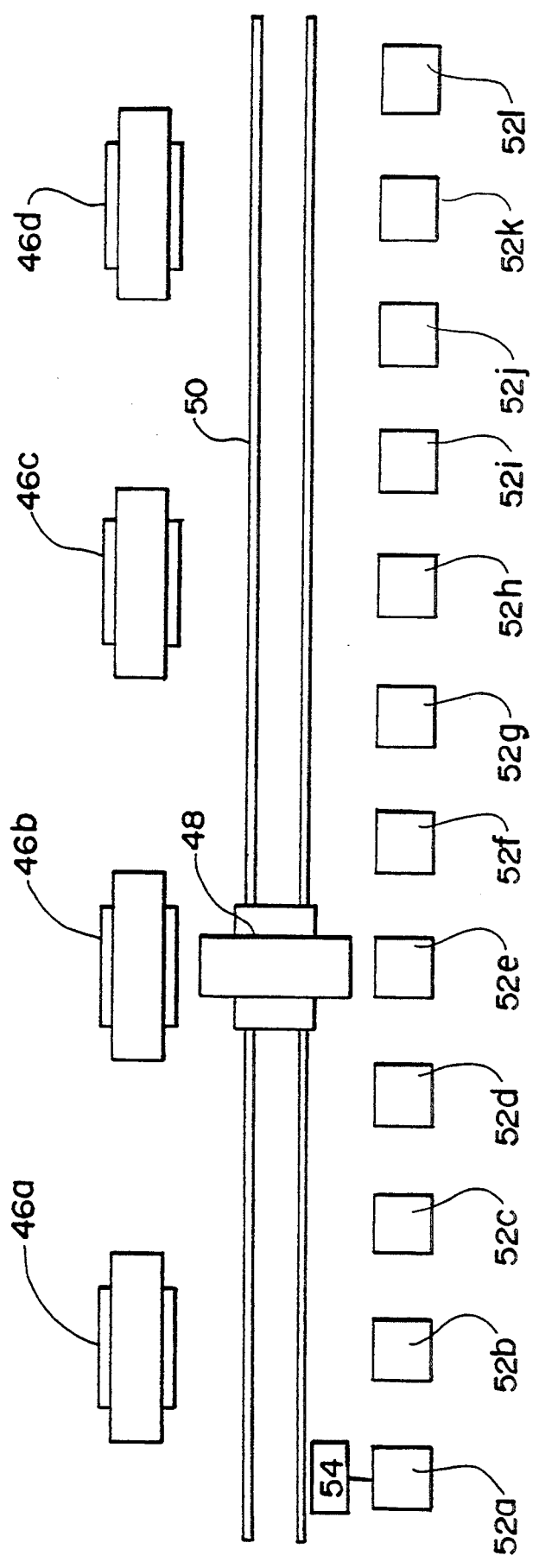

5,417,262

DEVICE FOR CUTTING THIN BOARDS

BACKGROUND OF THE INVENTION

1. Field of the Invention

The invention relates to devices for cutting thin boards from squared timber and more particularly to a cutting device having a feed table and at least one cutting table with a cutting blade mounted thereon.

2. Description of Related Technology

A known device for cutting thin boards from a cant (i.e. squared timber) includes a feed table and at least one cutting table and is described, for example, in EP-A-497,233 (Aug. 5, 1992) and counterpart Canadian patent application 2,060,942 published Jul. 31, 1992. The cant which is to be cut into thin boards is disposed substantially lengthwise on the feed table and is fed toward the cutting table upon which a blade is mounted at a front edge thereof which faces the feed table. The cutting table supports a cant after a thin board is cut from the cant by the blade. The cutting edge of the blade is primarily disposed in substantially the same plane as the cutting table and is separated from and substantially parallel to the feed table. However, the cutting edge may project somewhat above the plane of the cutting table. A gap formed by the separation of the blade and the feed table is utilized for conveying a cut board between the cutting edge and a back edge of the feed table opposite the cutting edge. The distance between the cutting edge of the blade and the feed table largely determines the thickness of the board to be cut. The feed table and the cutting table are adjustable relative to each other with respect to the gap therebetween so as to adjust for a desired thickness of a board to be cut.

The cutting blade includes two contact surfaces which form an acute angle at the cutting edge of the blade. One of the contact surfaces is disposed substantially parallel to the surface of the feed table and forms part of a cutting table upon which the cant (less a board thickness) remains supported after a board is cut from the cant. The other contact surface, which is disposed at an acute angle from the surface of the cutting table, substantially serves as a receiving surface for conveying the thin board being cut.

Such a cutting device includes a feed mechanism for pushing a cant forward on the feed table in a lengthwise direction across the feed table and against the cutting edge of the blade and pressing mechanisms for pressing a cant against the feed and cutting tables during the cutting of a board.

The feed table and the cutting table, insofar as it is connected to the blade's first surface, need not be solid surfaces. The two tables can contain, for example, rollers for conveying the cant. Another possibility, however, is that the feed table, with the exception of an edge abutting the oppositely disposed cutting edge and parts of the cutting table, is completely constructed as a roller conveyor.

In the type of cutting device described above which is of interest herein, a preferred configuration of cutting device elements is one in which the feed and cutting tables have substantially horizontal surfaces and a cut board is conveyed downwardly through the gap between the feed table and the cutting table. However, other configurations and alignments of the feed and cutting tables may also be utilized. For example, the feed and cutting tables may be arranged perpendicularly, whereby the cant is then pressed sideways on the two tables by means of a press mechanism. In known devices of this kind, the press mechanism includes a rotating rubber belt, which, by means of press rollers arranged on an inner side of the belt, is pressed against the cant. Feed mechanisms for conveying a cant through the cutting device include separated, power-driven feed rollers, which grip the cant in pairs on either side of the cant and draw or push the cant through the device.

It is evident that the removal of boards from a cant by cutting (as compared to other methods, such as sawing) requires on the one hand, the use of very large feed forces to pull the blade through the cant. On the other hand, relatively high feed rates, up to 150 meters/minute, are appropriate in order to operate at a cutting rate higher than the natural splitting rate of the wood. These requirements demand a very robust machine design.

The blades utilized in such a cutting device are subject to high wear and tear, not only because of the harsh working conditions, but also because of foreign objects present in the wood, which may damage the blade cutting edge. The harsh working conditions further necessitate that the blade be hard and stable and, moreover, that the blade and the blade support be screwed or bolted at an exact position. The down-time required to exchange a blade which has become damaged or dull may therefore be considerable. Depending on working conditions, the service life of such cutting blades can be on the order of only two hours.

In installations for cutting thin boards from squared timber having a high cutting capacity, several cutting stations or units are typically arranged in sequence. A cant passes through one cutting unit after another in order to cut thin boards from the cant. Depending on the capacity of the installation, a sufficient number of cutting units are arranged in sequence so that a cant is completely cut up into boards of predetermined thickness in a single pass through the series of cutting units. For example, seven cutting units can be arranged in sequence, whereby each of these cutting units constitutes a separate cutting machine. Alternatively, the cutting units may be arranged in groups within a single machine.

In such a linear arrangement of cutting units, if a blade of a single cutting unit has to be exchanged, it is typically necessary to shut down the entire line, even if a reserve cutting unit is available. In such a situation, the cants may be conveyed through a cutting unit in an idling mode without a board being cut from the cants. However, because the cants still pass through the region of the blade in an idling cutting unit, it is generally not possible to convey the cant through the unit and carry out blade-exchange work simultaneously. If blade exchanges of the individual cutting units of a line are required at different times, undesirable, above-average service times result for the line.

SUMMARY OF THE INVENTION

It is an object of the invention to overcome one or more of the problems described above. In particular, it is an object of the invention to provide a device for cutting thin boards from cants in such a way that a required blade exchange can be carried out in a minimum of time and thus with minimal machine idling.

According to the invention, a device for cutting thin boards includes a feed table and at least one cutting table adapted to support a cant after a thin board is cut from the cant. A blade is mounted at a front edge of the cutting table which faces the feed table. A cutting edge of the blade is substantially disposed in a plane of the cutting table and parallel to and separated from the feed table. A gap is formed by this separation for transporting a cut board between the cutting edge and a back edge of the feed table. The feed table is adjustable relative to the cutting table with respect to the separation therebetween so as to adjust for the thickness of the board being cut by the blade. The cutting device includes a feed mechanism for pushing a cant forward on the feed table in a lengthwise direction and against the cutting edge of the blade and a pressing mechanism for pressing a cant against the feed and cutting tables during the cutting of a board.

According to the invention, the blade is clamped to a blade support which can be set interchangeably in the cutting table with a replacement blade support, the blade support and the replacement blade support each adapted to clamp onto the cutting table at an exact position.

By exchanging not only the blade but also the entire blade support with blade, it is possible to choose a blade and blade support design for the cutting machine that is sufficiently stable to withstand harsh working conditions. It is possible that the structural component, i.e., the blade support, might form a considerable part of the cutting table, possibly even representing the entire contact region of the cutting table. It is desirable to design the blade support in such a way that it can be removed from a side of the cutting device. However, it may also be desirable to design the blade support in such a way that an initial slight lifting of the blade support is required in order to release the support from cooperating lockings or centerings. In order to quickly fasten the blade support in the cutting device, such a device can be equipped with automatic centering mechanisms and quick-acting clamping mechanisms. The clamping mechanisms may be hydraulically assisted in order to avoid time-consuming mechanical manipulations.

Exchange devices having the above-described attributes are known from machine-tool technology wherein exchange pallets constructed in the form of work piece mounting tables are connected to a machine carriage of a machine tool by means of a quick-acting clamping mechanism. The exchange pallets allow a work piece about to be machined to be clamped and securely positioned to the exchange pallet outside of the machine tool, thereby reducing machine idling time because the machining can begin immediately after the insertion of the work piece into the machine tool. Such exchange pallets serve, as mentioned, not for the exchange of a tool, but for the exchange of a work piece. For the exchange of a tool in a machine tool, other kinds of exchange devices have been utilized.

In order to remove a heavy blade and blade support in a board cutting device as described herein so that a new blade support may be installed in the cutting device, the invention provides mechanical transfer apparatus which may be permanently attached to the cutting device, positioned at the device, or otherwise ready as needed to be connected to the device. Furthermore, the invention comprehends at least one receiving surface or setup, either connected to or connectable to the mechanical transfer apparatus, so that the blade support taken from the device may be laid down immediately in a place where the work of exchanging the blade can be carried out. It is also desirable to include at least one other receiving surface upon which an exchange or replacement blade support is placed in standby position so that it can be installed in the device by the mechanical transfer apparatus as required.

In a preferred embodiment of the apparatus according to the invention, a device for sharpening the cutting blade, for example, a device for lapping or grinding the blade, is attached or attachable to a receiving surface that cooperates with a transfer apparatus. The sharpening device is attached or attachable to the receiving surface in such a way that a used cutting blade on the receiving surface can be processed by the sharpening device and thus restored to a usable state. The sharpening device may be mounted on the transfer apparatus, thereby reducing to a minimum the manipulations required for servicing the cutting blade.

The transfer apparatus and the receiving surfaces can be constructed in different ways, as separate or combined units. An example of a combined unit is a rotary table equipped with two receiving surfaces positioned diametrically thereon. Rotation of the rotary table allows the receiving surfaces to be alternately aligned with the cutting device. The rotary table also contains the transfer apparatus with which a blade support can be transferred from a receiving surface aligned with the device to the cutting table of the device. In such a configuration, the blade exchange is carried out on the rotary table at the receiving surface of the rotary table located in a position rotated away from the cutting table.

For a linear arrangement of several cutting units, a rotary table or a linear transfer apparatus may be utilized to provide a transfer path for the blade and blade support which is transverse to the line formed by the cutting units. The rotating table or linear transfer apparatus is disposed on a conveying track which is substantially parallel to the line formed by the cutting units. One or several receiving surfaces are arranged at a side of the conveying track opposite the cutting units so that, as needed, the mobile transfer apparatus can be assigned, on the one side, to a particular cutting table of a device and, on the other, to a particular receiving surface.

A cutting device having a single cutting unit may also be equipped with a transverse transfer apparatus attached to the cutting table. The transfer apparatus has a receiving surface disposed on an end thereof located away from the cutting table. The transfer apparatus may, for example, include two receiving surfaces located at either side of an end thereof, with the transfer apparatus being capable of taking a blade support from one of the receiving surfaces and moving the support to the cutting table and also capable of moving a used blade and associated blade support from the cutting table to the second receiving surface.

In the wood-cutting devices described herein which have a feed table and a cutting table with a cutting blade mounted thereon, the blade forms an acute angle with the feed direction of the cant, which can also be referred to as the longitudinal direction of the device. The blade is thus disposed over a considerable region of this longitudinal direction, which hereafter will be referred to as the longitudinal extension region of the blade. Owing to the very acutely diagonal arrangement of the blade, both the feed table and the cutting table project from opposite sides of the longitudinal direction of the device into the blade longitudinal extension region, each of their functional surfaces forming a quasi triangle. It is the triangular part of the cutting table which projects into the blade extension region that is desirably constructed separately from the part of the cutting table extending from behind the end of the blade. This separated triangular portion of the table thus may form a part of the exchangeable blade support.

The blade support is also constructed so that it can be moved sideways out of the cutting device, i.e., transverse to the longitudinal direction of the device. The blade support thereby extends, at least in its width, over the entire longitudinal extension region of the blade. A blade support having a cutting edge mounted at the front thereof can be inserted laterally into the cutting device in such a way that as the cutting edge approaches the edge of the feed table, the blade can be aligned with the feed table at the proper separation therefrom and then securely locked. Such an embodiment avoids moving of the press and the feed mechanisms of the cutting device prior to exchanging a blade support.

It is possible that in such an embodiment of the invention, a blade exchange can be carried out while the line is running if the cutting unit subject to exchange is idled and the blade is withdrawn into or below the surface of the feed table so as to avoid contact with a cant passing through the cutting unit. In order to further allow the passage of cants through an idling unit when the blade is withdrawn and blade exchange is carried out in this position, it may be necessary to divide the cutting table in such a way that the part of the table which is disposed in the extension region of the blade, together with the blade, can be withdrawn from a remaining, adjoining part of the cutting table. In this way, the blade can be positioned securely in the device beyond contact with a cant even when the cutting unit is in the idling mode, when the feed table and the other part of the cutting table lie in the same plane. A blade exchange can be carried out in such a position notwithstanding the further passage of cants through the cutting device.

The above-described divided cutting table arrangement may also be appropriate when a single device contains two cutting units and the cutting table of the first cutting unit simultaneously serves as a feed table for the next cutting unit. If the cutting table has a divided design, the second cutting unit can still operate while the first blade is being exchanged.

Quick clamping of the blade support in the cutting device may be accomplished by, for example, having projecting elements on one of the blade support or the cutting device. The projecting elements have cross sections shaped like hammer heads on the surface being brought into contact with the other of the blade support or the cutting device. On placing the blade support into the device from the side, the projecting elements are inserted into recessed T-slots of the respective mating part. The projecting elements with cross sections shaped like hammer heads are then clamped by a hydraulically controlled mechanism into the recessed surfaces of the T-slots. This is only one possible design for the mutual clamping of the parts concerned. Such clamping mechanisms as well as exact positioning mechanisms are known from machine-tool engineering for work-table exchange apparatus. In the invention, the clamping is preferably accomplished in such a way that the blade is braced securely in a direction perpendicular to its cutting edge in the feed plane of the cant in order to protect the blade from the feeding force of the cant.

Other objects and advantages of the invention will be apparent to those skilled in the art from the following detailed description taken in conjunction with the drawings and the appended claims.

BRIEF DESCRIPTION OF THE DRAWINGS

FIG. 4 is a schematic view of a multiple arrangement of cutting devices according to the invention having a mobile exchange apparatus.

DETAILED DESCRIPTION OF A PREFERRED EMBODIMENT

Figure 1:
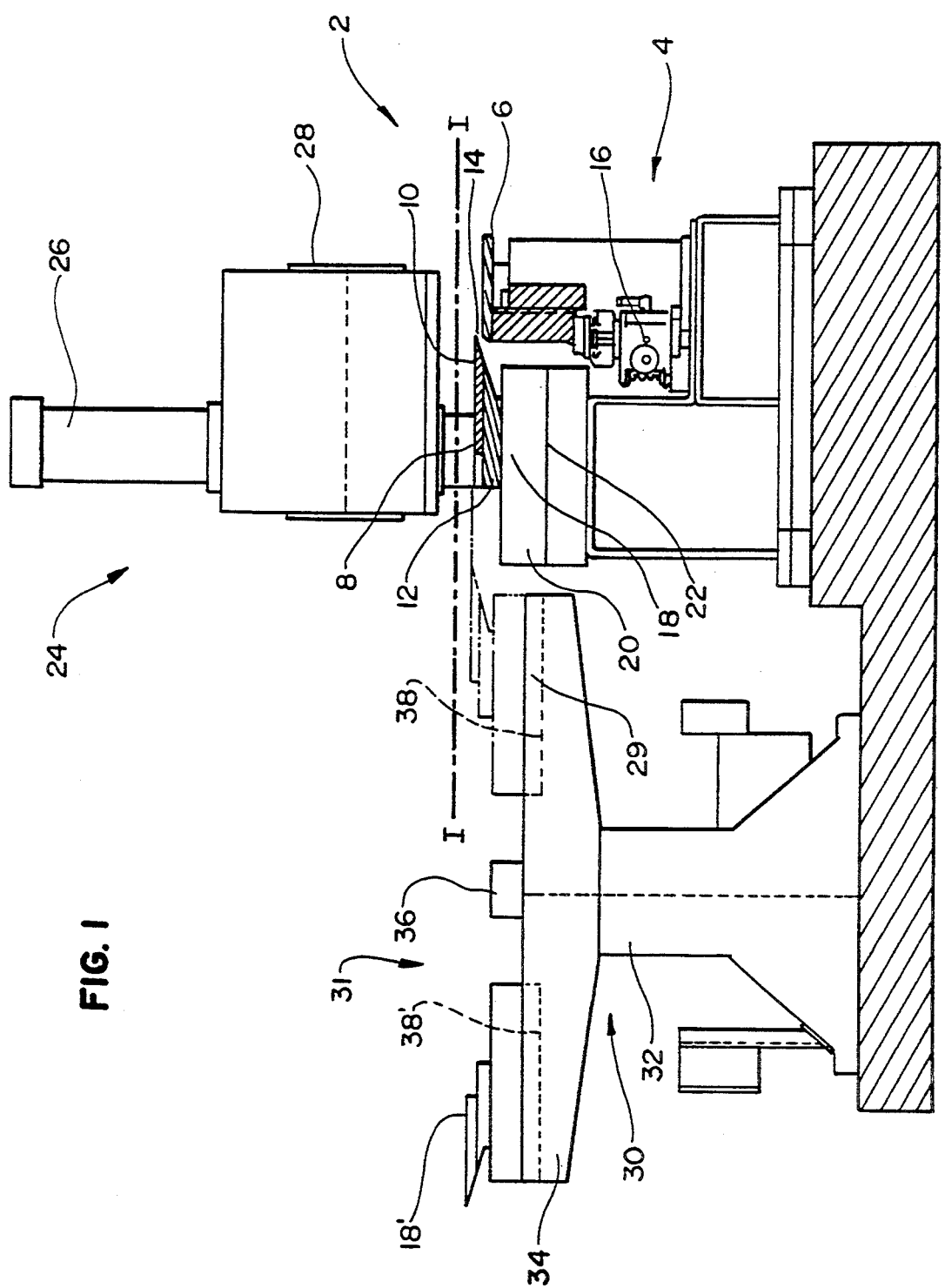
FIG. 1 is a sectional view of a cutting device according to the invention having a rotary table for tool exchange and shown transverse to the feed direction of a cant being cut.

As illustrated in FIG. 1, a cutting device generally designated 2 according to the invention comprises a base generally designated 4 which supports a feed table 6 and a cutting table 8 mounted on a top side of the base 4.

Figure 2:
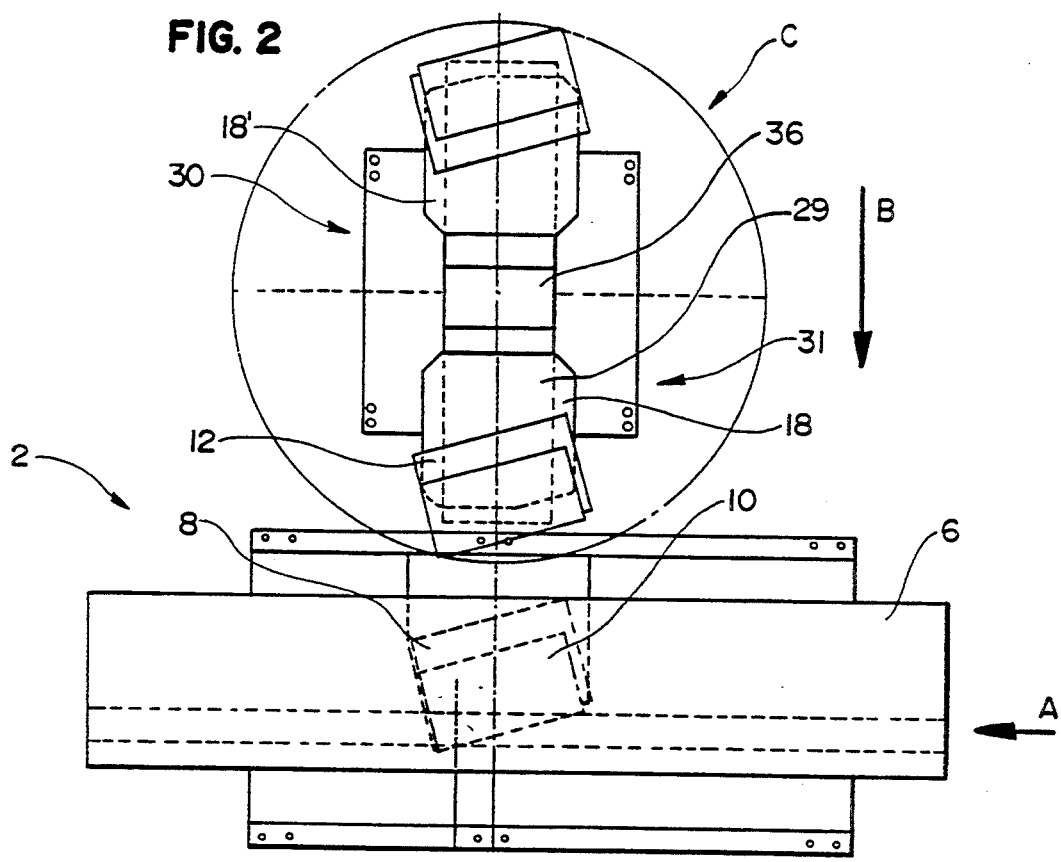
FIG. 2 is a sectional view taken along line I—I of FIG. 1.

The feed table 6 and the cutting table 8 are disposed horizontally and serve as a support for a cant (not shown) to be cut. As illustrated in FIG. 2, the direction designated "A" is the feed direction in which the cant to be cut is fed into the cutting device 2. With respect to the feed direction "A," the feed table 6 is disposed in front of the cutting table 8.

A cutting blade 10 is mounted or set into the cutting table 8 on an edge facing the feed table 6. A cutting edge of the blade 10 is directed toward the feed table 6. The cutting blade 10 is mounted in a blade holder 12 which is connected to the cutting table 8. The blade 10 extends above the feed table 6. A gap 14 resulting from the separation between the cutting blade 10 and the feed table 6 is adjustable with respect to the vertical by raising or lowering the feed table 6 by means of an adjusting device 16. The gap 14 determines the thickness of the board being cut.

Furthermore, as shown in FIG. 2, the cutting blade 10 is disposed at an acute angle with respect to the feed direction "A" of the cant. Since the plane of the cross section of the cutting device 2 illustrated in FIG. 1 lies perpendicularly to the feed direction "A," the position of the gap 14 in FIG. 1 is shown only for a specific position of the cutting device 2. If the plane of the cross section is displaced in the direction "A," the feed table 6 will be narrower owing to the oblique extension of the cutting edge. Conversely, the feed table 6 will be broader and the visible cross section of the cutting blade 10 narrower if the plane of the cross section is displaced in a direction opposite the feed direction "A."

The cutting device 2 further comprises an upper structure generally designated 24, supported by two pedestals 26, which are anchored in the base 4 of the cutting device 2. The upper structure 24 extends above the feed table 6 and the cutting table 8. Press mechanisms are disposed in the upper structure 24, operating through a press belt (not shown) that passes over two guide rollers 28, at least one of which is power-driven, and runs in the feed direction "A" of the cant. The press belt lies on a top side of the cant being cut and transfers the press force from the press mechanism, situated between the guide rollers and operating perpendicular to the cant, by press rollers (not shown). The press rollers press the cant as it travels along the feed table 6 and/or the cutting table 8 and presses the cant against the cutting edge of the blade 10.

In use, when a cant is cut, it is conveyed in the direction "A" into the cutting device 2 and directed under the rotating press belt over the feed table 6 to the cutting blade 10. The press rollers thereby exert a perpendicular pressure on the cant with respect to the feed table 6. A thin board is cut along the cutting edge of the cutting blade 10 from the bottom side of the cant lying on the feed table 6. The thickness of the cut board is determined by the breadth of the gap 14. The separated board is carried off along a lower contact surface of the cutting blade 10 and away from the cutting device 2. The remaining cant is further conveyed in the direction "A" over the cutting table 8 out of the cutting device 2 and, if appropriate, into a further cutting device (not shown).

Depending on the operating conditions, it is necessary to exchange the blade 10 after a certain operating time. For this purpose, the blade holder 12, together with its associated cutting blade 10, is fastened to a blade support 18. The blade support 18 is set or mounted into the cutting table 8 and is reversibly connected to the cutting device 2. The blade support 18 has a foundation 20, the bottom surface of which is lockable to a mounting surface or table 22. The locking elements are illustrated in more detail below in connection with FIGS. 3a–3c.

As shown in FIG. 2, the blade support 18 extends in the feed direction "A" over the entire length of the cutting edge of the blade 10. The feed table 6 is cut out at a side thereof which faces the cutting edge of the cutting blade 10 so that, when a blade exchange is desired, it is accomplished in a direction indicated by an arrow designated as "B" in FIG. 2. The blade support 18 therefore can be mounted on and removed from the cutting device 2 in an unobstructed manner in a plane parallel to the cant supporting surface of the cutting table 8 but in a direction perpendicular to the feed direction "A" of the cant.

In order to exchange the blade support 18, the cutting device 2 includes a rotary table generally designated 30 equipped with a conveyor track 29 and a transfer apparatus generally designated 31 having a shifting device 36. Similar rotary tables are known for the manipulation of work pieces. The rotary table 30 includes a bottom or under frame 32, in which or upon which are mounted, if appropriate, driving mechanisms and/or control devices. A swivel table 34 is mounted on the frame 32 and is rotatable 360° as indicated by a dotted circle designated "C" in FIG. 2. The swivel table 34 rotates in a plane parallel to the feed direction "A" and to the direction of motion "B" of the blade support 18. The swivel table 34 can be driven by an electric motor mounted on the bottom frame 32 or hydraulically, pneumatically, or by any other suitable motor.

The rotary table 30 cooperates with the other elements of the cutting device 2. Accordingly, the bottom frame 32 and the swivel table 34 are of such a size that the swivel table 34 is at the same height as the mounting surface 22 for the blade support 18. This ensures that, on exchanging the blade support 18 with a replacement stand-by blade support 18', the blade supports 18 and 18' are moved essentially horizontally in the direction "B" by the transfer apparatus 31. Furthermore, control devices (not shown), may be mounted on the bottom frame 32 and used to control the sequence of motion of the transfer apparatus 31 when a blade support 18 or 18' is exchanged in the cutting device 2.

The shifting device 36 of the transfer apparatus 31 is constructed, for example, from at least two hydraulically or pneumatically driven cylinders set in the center of the swivel table 34 and extendable in opposite directions. Alternatively, the shifting device 36 can be driven mechanically. The shifting device 36 is equipped with means for gripping the blade support 18 or 18' and cooperates with the cutting table 8 and the blade support 18 clamped therein so that, when the blade support 18 is released, it can be moved from a releasable attachment in the cutting device 2 and over the conveyor track 29. After the shifting device 36 grips the blade support 18, the blade support 18 is moved in the direction "B" away from the mounting surface 22 by contraction of the shifting device 36. Accordingly, a replacement blade support 18' may be transported toward the mounting surface 22 by expansion of the shifting device 35.

Two receiving surfaces 38 and 38' are integrated in the swivel table 34 for the blade supports 18 and 18', respectively. The surfaces 38 and 38' are arranged opposite each other in mirror-image fashion on a top side of the swivel table 34 and each can be loaded from a periphery of the swivel table 34 to the center thereof with one blade support 18 or 18'. The receiving surfaces 38 and 38' have clamping devices for the releasable attachment of the blade supports 18 and 18' which are similar to those of the mounting table 22 in the cutting device 2.

Figure 3A:
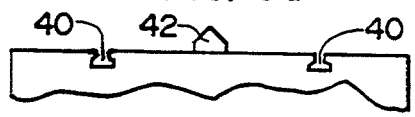
FIG. 3a is a sectional view of a clamping device of a cutting device according to the invention.
Figure 3B:
FIG. 3b is a sectional view of a second embodiment of a clamping device of a cutting device according to the invention.
Figure 3C:
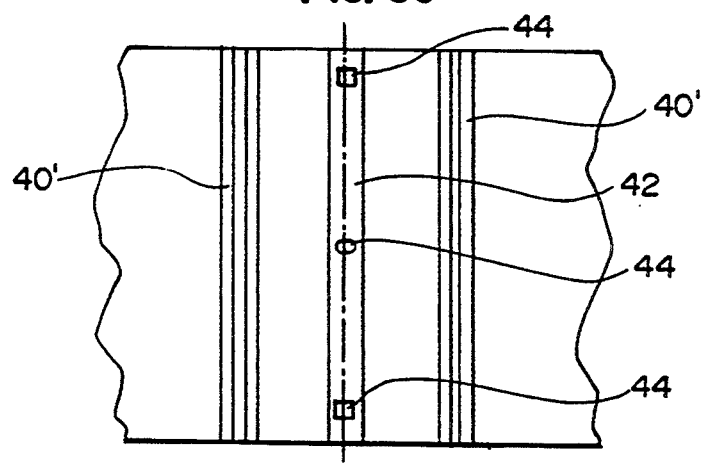
FIG. 3c is a top plan view of a third embodiment of a clamping device of a cutting device according to the invention.

Sample embodiments of the clamping devices for the releasable attachment of the blade supports 18 and 18' to the mounting surface 22 or to the receiving surfaces 38, 38' are shown in FIGS. 3a, 3b, and 3c. Such clamping devices are known from machine-tool engineering for tool mounting tables.

FIG. 3a shows a section through an embodiment of a clamping device for the blade supports 18 and 18' in which at least two parallel T-slots 40 are embedded in the mounting surface 22 or in the receiving surfaces 38 and 38'. The T-slots 40 are oriented in the direction "B" and have a length substantially corresponding to the length of the blade support 18 or 18'. The T-slots 40 interlock with hammerhead-shaped locking elements (not shown) disposed on the bottom surface of the foundation 20 of the blade supports 18 and 18'. The T-slots 40 and corresponding locking elements are latched onto each other by moving the blade support 18 or 18' parallel to the mounting surface 22 or the receiving surface 38 or 38'. When the locking elements are in contact with the T-slots 40, the blade support 18 or 18' is securely fastened to the mounting surface 22 or the receiving surface 38 or 38'.

In order to facilitate the insertion of the locking elements into the T-slots 40, a raised, shaped guide track 42 is located on the mounting surface 22 or the receiving surface 38 or 38'. The bottom surface of the foundation 20 of the blade support 18 or 18' has a shaped recess (not shown) which cooperates with the guide track 42. When the blade support 18 or 18' is moved, the shaped recess envelops the track 42 and the blade support 18 or 18' slides along the guide track 42. This ensures that the elements of the clamping device are brought into contact with one another without any problem. When the locking elements are in contact with the T-slots 40, they are clamped against each other utilizing a control mechanism (not shown). The control mechanism can be operated hydraulically, pneumatically, or mechanically.

FIG. 3b shows a modified clamping device for the blade support 18 or 18' in which slots 40' are not embedded in the mounting surface 22 or in the receiving surface 38, 38', but are rather bent cleats, which are welded or screwed onto and rise above the mounting surface 22 or the receiving surface 38 or 38'. FIG. 3b also shows a shaped guide track 42 for guiding the blade support 18 or 18' into a specific position with respect to the T-slots 40' on the mounting surface 22 or the receiving surface 38 or 38'. For the clamping device shown in FIG. 3b., the locking elements of the blade support 18 and 18' and the mounting surface 22 or receiving surfaces 38 and 38' are also brought into contact by parallel motion.

FIG. 3c shows a top plan view of a clamping device for the blade supports 18 and 18'. In addition to the locking elements 40' already described, the clamping device shown in FIG. 3c also has positioning aids 44 for the blade support 18, 18'. The positioning aids 44 effect a precise orientation of the cutting blade 10 in the cutting device 2. In order to ensure a good cutting quality, the cutting blade 10 must not only be securely clamped but also assume a specified spatial position with specified coordinates in directions "A" and "B" as well as in height with respect to the feed table 6. Therefore, the positioning aids 44 ensure that the orientation of the blade support 18 in the cutting device 2 is constant and reproducible.

The positioning aids 44 are built into the guide tracks 42 as recesses and the specified position of the blade support is then achieved when projections on the bottom surface of the foundation 20 of the blade support 18, 18' (not shown) are positioned to cooperate with the recessed positioning aids 44 and are inserted therein. In the embodiment shown in FIG. 3c, it is necessary to lift the blade support 18 or 18' somewhat in order to release it from the positioning aids 44.

Clamping devices (shown in FIGS. 3a, 3b and 3c), blade supports 18 and 18', and the transfer apparatus 31 associated with the cutting device 2 function together as follows when the blade supports 18 and 18' are exchanged: The rotary table 30 is oriented so that a first empty receiving surface 38 is aligned with the cutting table 8 in such a way that the blade support 18 can be moved from the mounting surface 22 to the receiving surface 38 by shifting the blade support 18 in the direction "B" after releasing the clamping device. To perform the shifting of the blade support 18 to the receiving surface 38, the shifting device 36 expands from a stationary position in the center of the swivel table 34 and extends across the unoccupied receiving surface 38 all the way to the blade support 18 which is clamped in the cutting device. The shifting device 36 grips the blade support 18 and moves the blade support 18 toward the receiving surface 38 by contraction of the shifting device 36 after the clamping device is released. The blade support 18 is releasably locked on the receiving surface 38 in the same way as it was locked on the mounting surface 22. After locking of the blade support 18 on the receiving table 38, the shifting device 36 is released and returned to the stationary position in the center of the swivel table 34.

The swivel table is then rotated 180° so that the receiving surface 38' and the ready-to-use blade support 18' mounted thereon lie opposite the mounting surface 22 with respect to the direction "B." The shifting device 36 then expands in the direction of the receiving surface 38' and grips the releasable blade support 18' which is fastened to the receiving surface 38'. After unlocking of the blade support 18' from the surface 38', the blade support 18' is shifted all the way to the mounting surface 22 by further expansion of the shifting device 36 in the direction "B". After the blade support 18' reaches a specified position on the mounting surface 22, the blade support 18' is clamped thereto. Now the T-slots 40 and the positioning aids 44 of the mounting surface 22 are in contact with the corresponding locking elements of the blade support 18' and the cutting blade 10 mounted on the blade support 18' is in a specified position with respect to directions "A" and "B" as well as with respect to the feed table 6. After the blade support 18' is clamped to the mounting surface 22, the shifting device 36 is released and return back to the stationary position on the swivel table 34.

Immediately after the blade support 18' is locked in the cutting device 2, the device 2 is again operational. The blade support 18 can now be worked on at the receiving surface 38 of the swivel table 34. For example, the cutting blade 10 can be exchanged.

A sequential arrangement of four cutting devices 46a, 46b, 46c and 46d shown in FIG. 4 is for the cutting of four thin boards from a cant, one after the other. A transfer apparatus 48, which moves along a track 50 parallel to the cutting devices 46a-d, is mobile, and can therefore be aligned with the cutting devices 46a-d. Receiving tables 52a-l for depositing blade supports (similar to the blade supports 18 and 18' described with respect to FIGS. 1 and 2), are aligned parallel to the cutting devices 46a-d and the track 50 so that the track 50 runs between the cutting devices 46a-d and the receiving tables 52a-l.

The transfer apparatus 48 has a mobile table having a top surface upon which a conveyor track (not shown) is mounted. The transfer apparatus 48 can be self-propelled by a motor attached to a bottom frame thereof or it may be propelled by an external motor.

The receiving tables 52a-l each include a frame, the top side of which is designed in such a way that a blade support can be clamped thereon similar to what is shown, for example, in FIG. 3. The top sides of the receiving tables 52a-l, the top surface of the transfer apparatus 48 (which is similar to the receiving surfaces 38, 38' shown in FIG. 3), and mounting surfaces of the cutting devices 46a-d (which are similar to the mounting surface 22 shown in FIG. 3) are arranged in a horizontal plane so that the blade supports can be shifted by a horizontal motion.

A blade sharpening device 54 as illustratively attached to receiving table 52a.

The exchange of a used blade support from one of the cutting devices 46a-d with a replacement ready-to-use blade support is accomplished by moving the transfer apparatus 48 on the track 50 to align the apparatus 48 with the cutting device 46a, b, c or d whose used blade support is to be removed. After the transfer apparatus 48 is aligned with the respective cutting device, the used blade support, as described previously with respect to FIGS. 1 and 2, is moved out of the cutting device and clamped to the transfer apparatus 48. The transfer apparatus 48 is then moved to the front of an empty receiving table 52a-l and the used blade support is shifted by the transfer apparatus 48 to the receiving table. After the used blade support is clamped on the receiving table, the transfer apparatus 48 is then moved to a different receiving table 52a-l upon which a replacement ready-to-use blade support is clamped. The transfer apparatus 48 moves the replacement blade support onto the conveyor track (not shown) and the replacement blade support is clamped on the transfer apparatus 48. After the transfer apparatus 48 is positioned once again before the cutting device from which the used blade support was removed, the ready-to-use blade support is moved from the conveyor track to the cutting device and clamped thereon in an exact position.

The foregoing detailed description is given for clearness of understanding only, and no unnecessary limitations should be understood therefrom, as modifications within the scope of the invention will be apparent to those skilled in the art.

I claim:

1. In a device for cutting thin boards from cants including:
   a feed table,
   at least one cutting table adapted to support a cant after cutting a board therefrom, said cutting table having a blade mounted thereon and positioned at a front edge thereof facing the feed table, the blade having a cutting edge substantially disposed in a plane of the cutting table and parallel to and separated from the feed table, whereby a gap is formed by the separation of the blade and the feed table for transporting a cut board between the cutting edge and a back edge of the feed table opposite thereto, the feed table being adjustable relative to the cutting table with respect to said separation of the blade and the feed table so as to adjust for the thickness of a board to be cut by the blade,
   a feed mechanism adapted to push a cant supported by the feed table and oriented length-wise thereon in a forward direction along the feed table and against the cutting edge of the blade, and
   a pressing mechanism adapted to press the cant against the feed table and the cutting table during the cutting of a board by the blade,
   the improvement comprising a blade support, the blade being clamped thereon, and means for interchangeably clamping said blade support or a replacement blade support to the cutting table at an exact position.

2. The improvement of claim 1 wherein said clamping means comprise a quick-acting clamping device.

3. The improvement of claim 2 wherein the quick-acting clamping device comprises elements having hammer-head-like cross-sections disposed on the blade support, and the replacement blade support and the cutting table has T-shaped undercut slots adapted to mate with said elements and wherein upon installing one of the blade support and the replacement blade support on the cutting table, said elements are inserted into said slots and clamped against the cutting table by hydraulically operated control devices.

4. The improvement of claim 1 comprising a transfer apparatus alignable with the cutting table and adapted to move the blade support and the replacement blade support in a sideward direction from the cutting table.

5. The improvement of claim 4 further comprising means for connecting the transfer apparatus to at least one receiving surface adapted for depositing the blade support thereon.

6. The improvement of claim 5 further comprising a blade sharpening device and means for attaching the blade sharpening device to the receiving surface.

7. The improvement of claim 5 wherein said receiving surface is a first receiving surface, said device comprising a second receiving surface in a standby position for receiving the blade support, wherein the transfer apparatus is adapted to move the blade support from the cutting table to the first receiving surface, place the blade support on the first receiving surface, move the replacement blade support from the second receiving surface to the cutting table and insert the replacement blade support in the cutting table.

8. The improvement of claim 7 wherein the transfer apparatus and the receiving surfaces are mounted on a rotating table, each receiving surface being movable into alignment with the cutting table and wherein the transfer apparatus includes a shifting device for transferring the blade support and the replacement blade support between the cutting table and one of the first and second receiving surfaces aligned therewith.

9. The improvement of claim 1 wherein the blade is set at an acute angle to a feed direction of the cant and wherein the blade support can be moved out of the cutting table in a direction transverse to said feed direction and away from the back edge of the feed table.

10. The improvement of claim 9 wherein the blade support has a width in the feed direction essentially corresponding to a length of the blade in the feed direction.

11. The improvement of claim 10 wherein the blade support having a blade clamped thereto can be retracted with a part of the cutting table from beneath a surface of a remainder of the cutting table.

* * * * *